United States Patent [19]

Tanaka

[11] Patent Number: 5,605,433
[45] Date of Patent: Feb. 25, 1997

[54] METHOD AND APPARATUS FOR STACKING BOX-SHAPED ARTICLES

[75] Inventor: Nobuhiro Tanaka, Saitama, Japan

[73] Assignee: KAO Corporation, Tokyo, Japan

[21] Appl. No.: 425,146

[22] Filed: Apr. 19, 1995

[30] Foreign Application Priority Data

Jun. 21, 1994 [JP] Japan .................................. 6-160711

[51] Int. Cl.$^6$ .................................................. B65G 57/06
[52] U.S. Cl. .................. 414/793.4; 414/786; 414/789.6; 414/794.2
[58] Field of Search ..................... 414/786, 791, 414/789.6, 793.8, 794.2, 794.9, 795.2, 795.3

[56] References Cited

U.S. PATENT DOCUMENTS

| | | |
|---|---|---|
| 2,919,821 | 5/1960 | Young . |
| 3,403,794 | 1/1968 | Lopez . |
| 3,591,019 | 6/1971 | Beninger . |
| 3,785,508 | 1/1974 | Hayden ................................ 414/789.6 |
| 5,405,240 | 4/1995 | Uno ...................................... 414/794.2 |

FOREIGN PATENT DOCUMENTS

| | | |
|---|---|---|
| 2409275 | 8/1975 | Germany . |
| 2521537 | 11/1976 | Germany . |
| 2751512 | 5/1979 | Germany . |
| 668053 | 11/1988 | Switzerland . |

*Primary Examiner*—Karen B. Merritt
*Assistant Examiner*—Janice L. Krizek
*Attorney, Agent, or Firm*—Dvorak and Traub

[57] ABSTRACT

A method of stacking a plurality of box-shaped articles is disclosed. A plurality of pairs of supporting members are provided such that they can be switched between an article supporting position and an article releasing position. After each box-shaped article is supplied to each of the supporting members set to the article supporting position, each of the supporting members is set to the article releasing position, and thus the box-shaped articles are stacked.

6 Claims, 7 Drawing Sheets

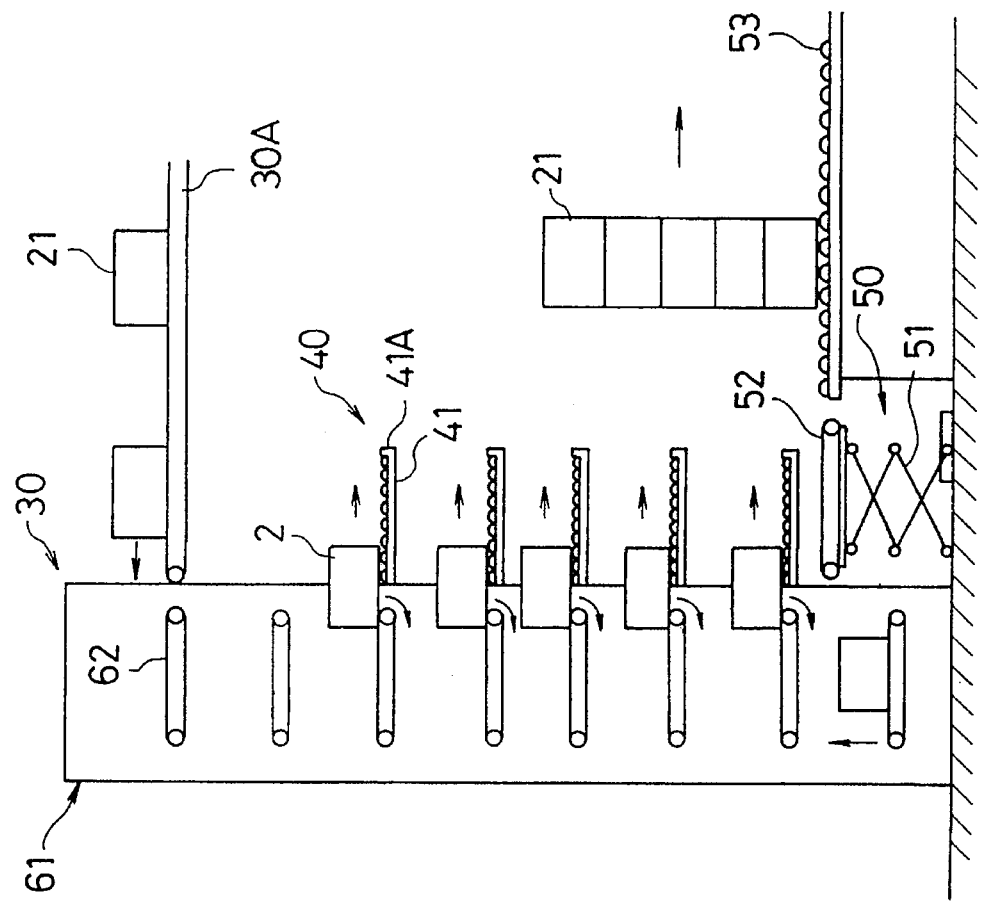
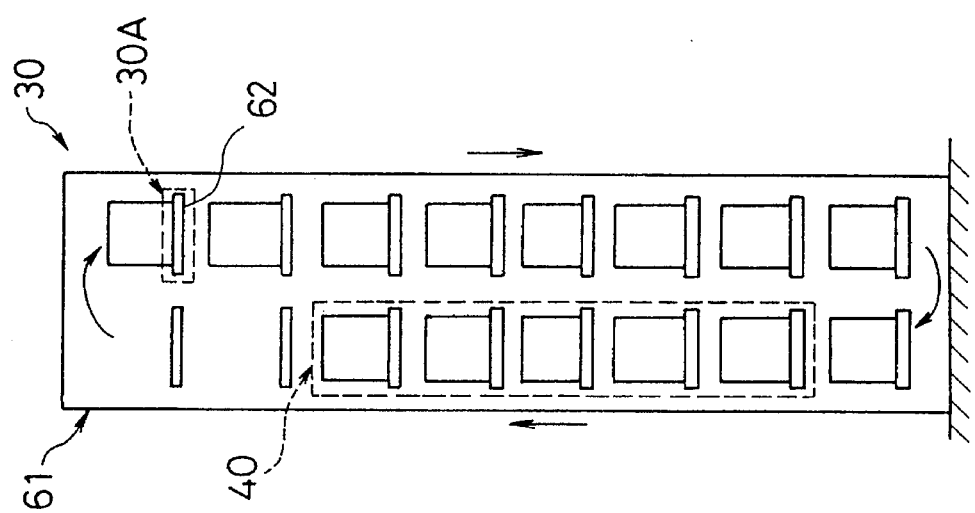

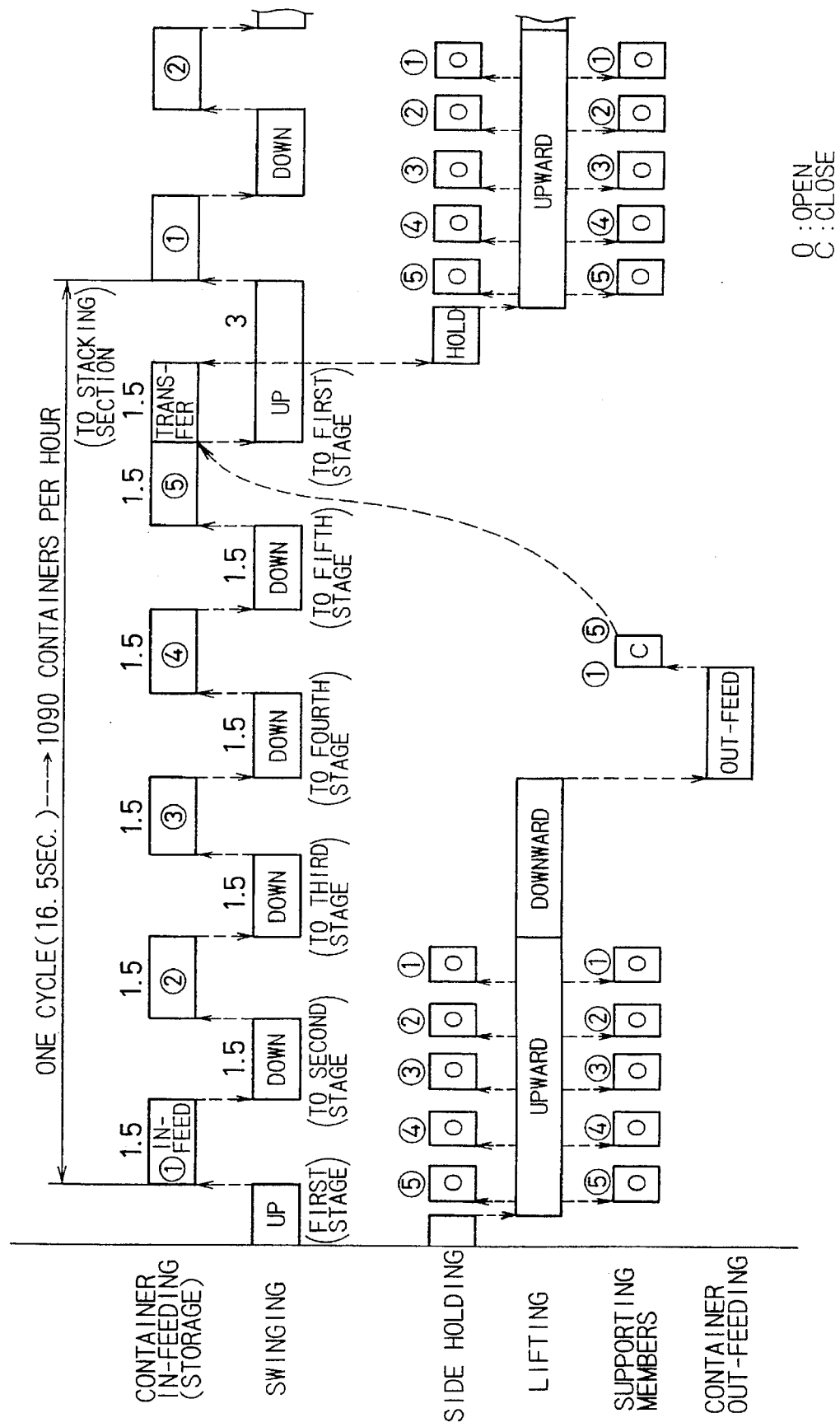

METHOD AND APPARATUS FOR STACKING BOX-SHAPED ARTICLES

BACKGROUND OF THE INVENTION

1. Field of the Invention

This invention relates to a method and an apparatus for stacking box-shaped articles such as containers and cardboard boxes.

2. Description of the Background

In stacking equipment of a warehouse, box-shaped articles such as containers and cardboard boxes must be stacked (i.e., vertically stacked) in predetermined quantities before setting the box-shaped articles on deliverers. At times, it is desired to stack the articles such that those to be delivered earlier are above those to be delivered later so that they can be readily taken out in individual destinations.

A detailed explanation of the prior art relating to the solution of this problem will be described later in connection with a discussion of the drawings.

SUMMARY OF THE INVENTION

An object of the invention is to permit the stacking of box-shaped articles with no side recess for engagement.

Another object of the invention is to permit the stacking of earlier delivered box-shaped articles to upper portion order regardless of whether the articles are supplied in earlier or later delivery order.

A further object of the invention is to reduce the overall stacking operation time of one stacking cycle with a plurality of stages, thus increasing productivity.

According to the first aspect of the invention, there is provided a method for stacking a plurality of box-shaped articles, which comprises the steps of providing a plurality of supporting members in respective, vertically spaced-apart article receiving zones, making the supporting members capable of being switched between an article supporting position and an article releasing position, supplying box-shaped articles to respective supporting members set to the article supporting position, and subsequently setting the supporting members to the article releasing position, thus effecting the stacking of the box-shaped articles.

According to the second aspect of the invention, there is provided the method for stacking box-shaped articles in the first aspect, wherein box-shaped articles can be supplied by a conveyor, the conveyor being capable of being moved vertically past the front of the article receiving zones, the conveyor being moved vertically and positioned such that its article out-feed level corresponds to the article in-feed level of the supporting members held at the article supporting position in each article receiving zone for supplying a box-shaped article from the conveyor to each supporting members.

According to the third aspect of the invention, there is provided the method for stacking box-shaped articles in the first aspect, wherein storage conveyors are each provided at a position immediately in front of the supporting members set to the article supporting position in each article receiving zone, supplying box-shaped articles to each of the supporting members being stacked together while following box-shaped articles are distributed to all the storage conveyors.

According to the fourth aspect of the invention, there is provided the method for stacking box-shaped articles in the second aspect, wherein storage conveyors are each provided at a position immediately in front of the supporting members set to the article supporting position in each article receiving zone, supplying box-shaped articles to each of the supporting members being stacked together while following box-shaped articles are distributed to all the storage conveyors.

According to the fifth aspect of the invention, there is provided an apparatus for stacking and feeding out a plurality of box-shaped articles, which comprises an article in-feeder, an article supporter and an article out-feeder, the article supporter being disposed on the out-feed side of the article in-feeder and above the article out-feeder and having a plurality of supporting members disposed in respective, vertically spaced-apart article receiving zones, each of the supporting members being capable of being switched between an article supporting position and an article releasing position, the article in-feeder being capable of supplying box-shaped articles to each of the supporting members set to the article supporting position, the article out-feeder being capable of receiving the box-shaped articles on each of the supporting members in a stacked from when the supporting members are switched to the article releasing position.

According to the sixth aspect of the invention, there is provided the apparatus for stacking box-shaped article in the fifth aspect, wherein the article in-feeder includes a conveyor capable of being moved vertically past the front of the article receiving zones and is positioned such that its article out-feed level corresponding to the article in-feed level of each of the supporting members set to the article supporting position in each article receiving zone.

According to the seventh aspect of the invention, there is provided the apparatus for stacking box-shaped article in the fifth aspect, wherein the article in-feeder includes one or more storage conveyors each disposed at a position immediately in front of the supporting members set to the article supporting position in each article receiving zone.

According to the eighth aspect of the invention, there is provided the apparatus for stacking box-shaped article in the sixth aspect, wherein the article in-feeder includes one or more storage conveyors each disposed at a position immediately in front of the supporting members set to the article supporting position in each article receiving zone.

After box-shaped articles have been supplied to and are supported on the supporting members, they are stacked one above another through the switching of the supporting members to the article releasing position. This means that in the stacking process there is no need of utilizing any engagement recess on the sides of the box-shaped article when supporting the article in space. In other words, it is possible to stack box-shaped articles without any engagement recess on any side. Further, box-shaped articles such as containers with engagement recesses provided on limited sides can be handled without restriction on the direction or position due to no engagement recess be provided.

By providing the movable conveyor for supplying box-shaped articles, and then positioning the conveyor to a position corresponding to the article in-feed level of each of the supporting members and causing the supply of the articles from the conveyor to each supporting members, it is possible to control conveyor movement position such that articles to be delivered earlier are stacked above those to be delivered later.

For example, where box-shaped articles are supplied in the earlier delivery order, the conveyor movement is controlled such that articles are supplied from the conveyor to the uppermost supporting members first and then to the successively lower supporting members. Where box-shaped articles are supplied in the later delivery order, on the other hand, the conveyor movement is controlled such that articles are supplied from the lowermost supporting members first and then to the successively upper supporting members. Where articles are supplied in an order without regard to any delivery order, the delivery order of the articles is detected until the articles are supplied by the conveyor, and the conveyor movement is controlled vertically such that supplied articles to be delivered earlier are distributed to upper supporting members.

With the provision of the storage conveyors at each position in immediate front of each supporting members, it is possible to concurrently carry out the operation of distributing box-shaped articles to all the storage conveyors and the operation of stacking the earlier supplied box-shaped articles on the supporting members. Thus, it is possible to reduce the overall stacking operation time of one stacking cycle with a plurality of stages and thus increase productivity.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 3A is a schematic side view showing a second embodiment of the invention;

FIG. 3B is a schematic front view of the second embodiment shown in FIG. 3A.

FIG. 4 is a view illustrating the stacking operation in the first embodiment;

DETAILED DESCRIPTION OF THE PREFERRED EMBODIMENT

Figure 5:
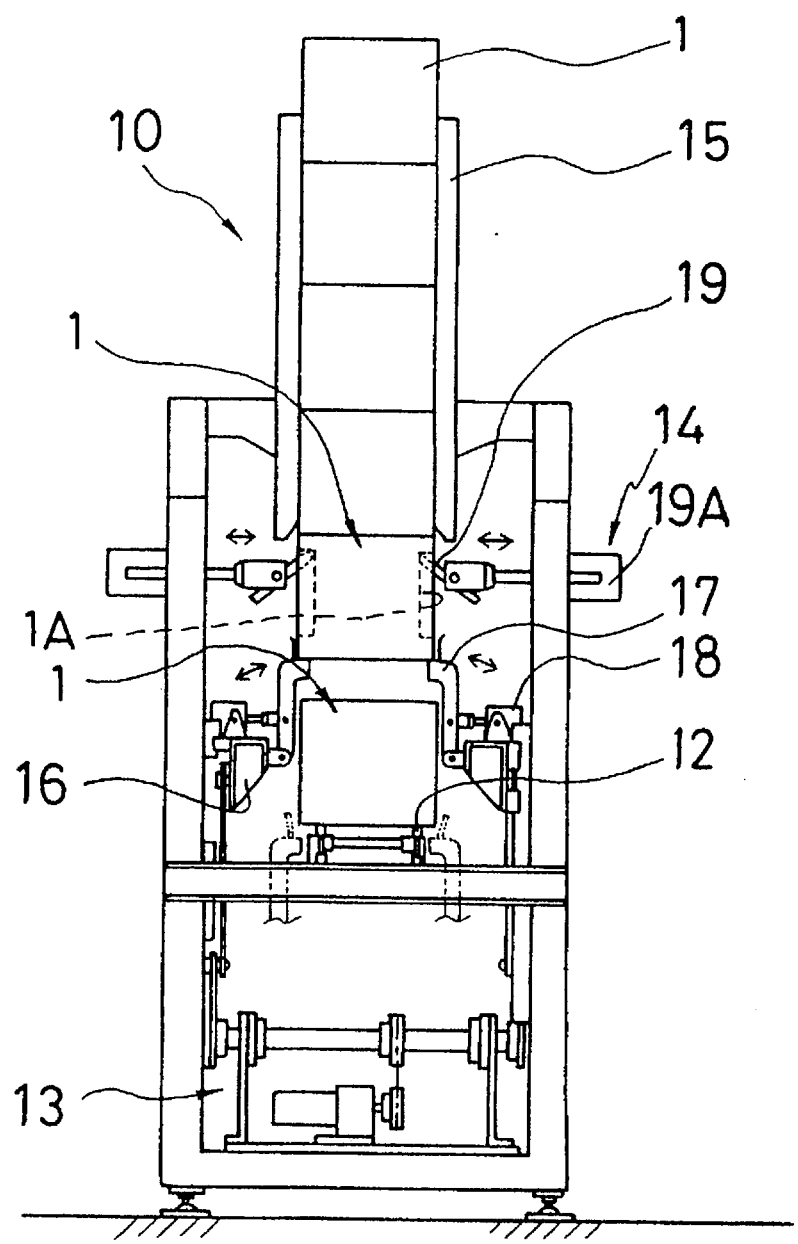
FIG. 5 is a front view showing a prior art apparatus.
Figure 6:
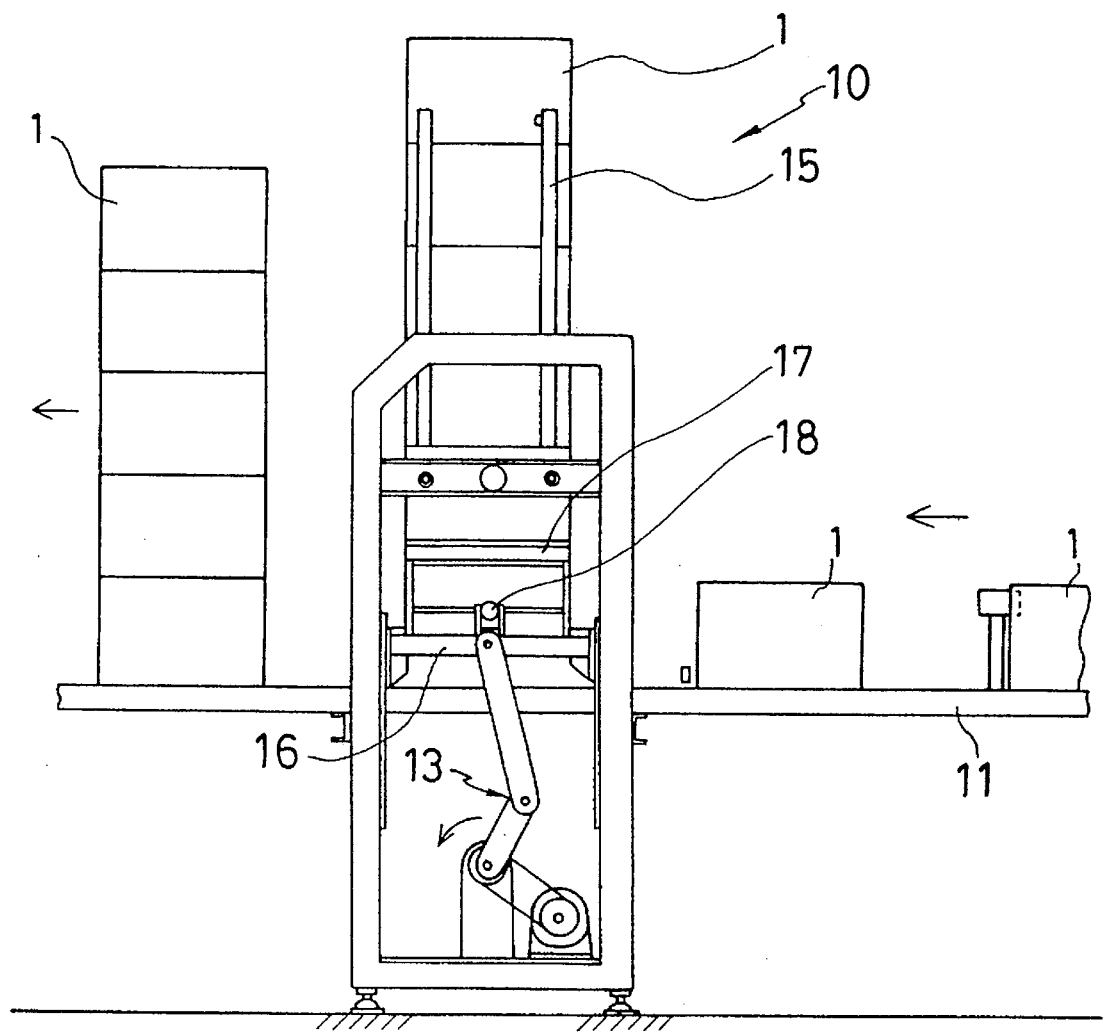
FIG. 6 is a side view showing the apparatus shown in FIG. 5.

The problem being addressed is evident from prior Japanese Patent Application No. Hei 5-350597, where a container stacking apparatus as shown in FIGS. 5 and 6 is presented.

That container stacking apparatus 10 comprises a container feed conveyor 11, a chain conveyor 12 for receiving containers 1 from the container feed conveyor 11, a lifter 13 for holding and lifting each container 1, a supporting mechanism 14 for supporting the container 1 lifted by the lifter 13, and a container guide 15 for holding the container 1, which has been lifted by the lifter 13 and supported by the supporting mechanism 14, from the both sides of the container 1. The lifter 13 includes a left and a fight lifting frame 16, a left and a right container holding arm 17 each coupled movably to each of the lifting frames 16 such as to hold the bottom of container 1, and opening/closing cylinders 18 each for moving each of the arms 17 toward and away from the position to hold the container 1.

The supporting mechanism 14 includes a pair of support pawls 19 for supporting the container 1 in engagement with side recesses 1A of the container 1 and support pawl releasing cylinders 19A for moving each support pawl 19 toward and away from the position to engage the container 1.

The container stacking apparatus 10 having the above construction performs an operation of stacking containers 1 as follows (see FIG. 7 as well).

(1) In the first place, the lifter 13 brings the lifting frames 16 to a lower set position to conceal the container holding arms 17 beneath the conveyor 12.

(2) Then, a first container 1 is brought to a lifting position, and then it is lifted by raising the lifting frames 16.

(3) When the lifting frames 16 are brought to their upper set position, the support pawls 19 are engaged in the recesses 1A of the container 1. In this state, the container holding arms 17 are opened by the opening/closing cylinders 18, and the lifting frames 16 are lowered. The lifted container 1 is held supported by the support pawls 19 above the conveyor 12.

(4) After the upper set position has been reached by the lifting frames 16, a second container 1 is brought to the lifting position concurrently with the above arm opening/closing operation.

(5) Like the first container 1, the second container 2 is lifted, thereby pushing up the first container 1. This time, the second container 1 is supported by the support pawls 19.

(6) A container counter counts the supplied containers. When a predetermined number of stages of the stack is produced, the container holding arms 17 are no longer opened after reaching to the upper set position by the lifting frames 16. This time, the support pawls 19 are opened by the support pawl releasing cylinders 19A. In this state, the lifting frames 16 are lowered, and the stacked containers 1 are transferred to the conveyor 12.

The above prior art container stacking apparatus 10, however, has the following problems.

First the operation of stacking the containers 1 in the container stacking apparatus 10, it is necessary to have the support pawls 19 engaged in the recesses 1A of a container, which has been lifted by the lifter 13, to tentatively hold the container 1 in the lifted position thereof. Therefore, in case the container 1 has the recesses 1A only on its two transversal sides and does not have any recess 1A on its two longitudinal sides, the direction of handling (i.e., direction of supplying) of the container 1 in the apparatus 10 is limited. In addition, the apparatus can not be applied to cardboard boxes or the like without any recess 1A.

Secondly, with the containers 1 supplied from the conveyor 11, those supplied earlier are always stacked above those supplied later. This means that it is necessary to supply containers 1 from the conveyor 11 in the early delivery order. That is, in case the containers 1 are supplied in the later delivery order from the conveyor 11, it is impossible to stack the containers 1 such that those to be delivered earlier are stacked to be above those delivered later.

Finally, the container stacking apparatus 10 has to repeat for each supplied container 1 two serial operations, i.e., the operation of bringing the container 1 to the lifter 13 and the operation of lifting the container 1 brought to the lifting position. Productivity, therefore, is low. For example, the overall stacking operation time of one stacking cycle with five stages is 21 seconds (857 containers per hour) as shown in FIG. 7, corresponding to low productivity.

Figure 1:
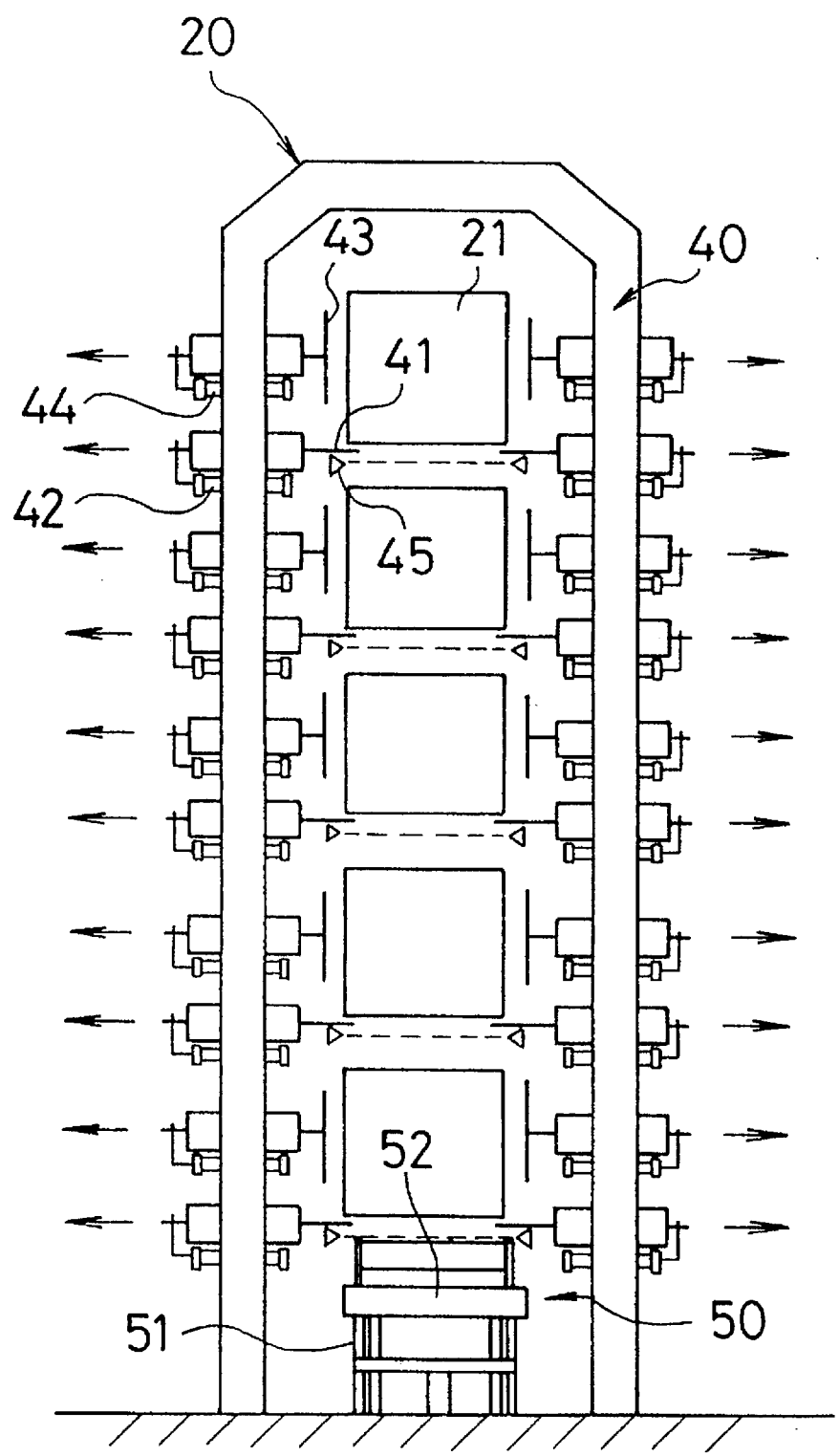
FIG. 1 is a front view showing a first embodiment of the apparatus according to the invention.
Figure 2:
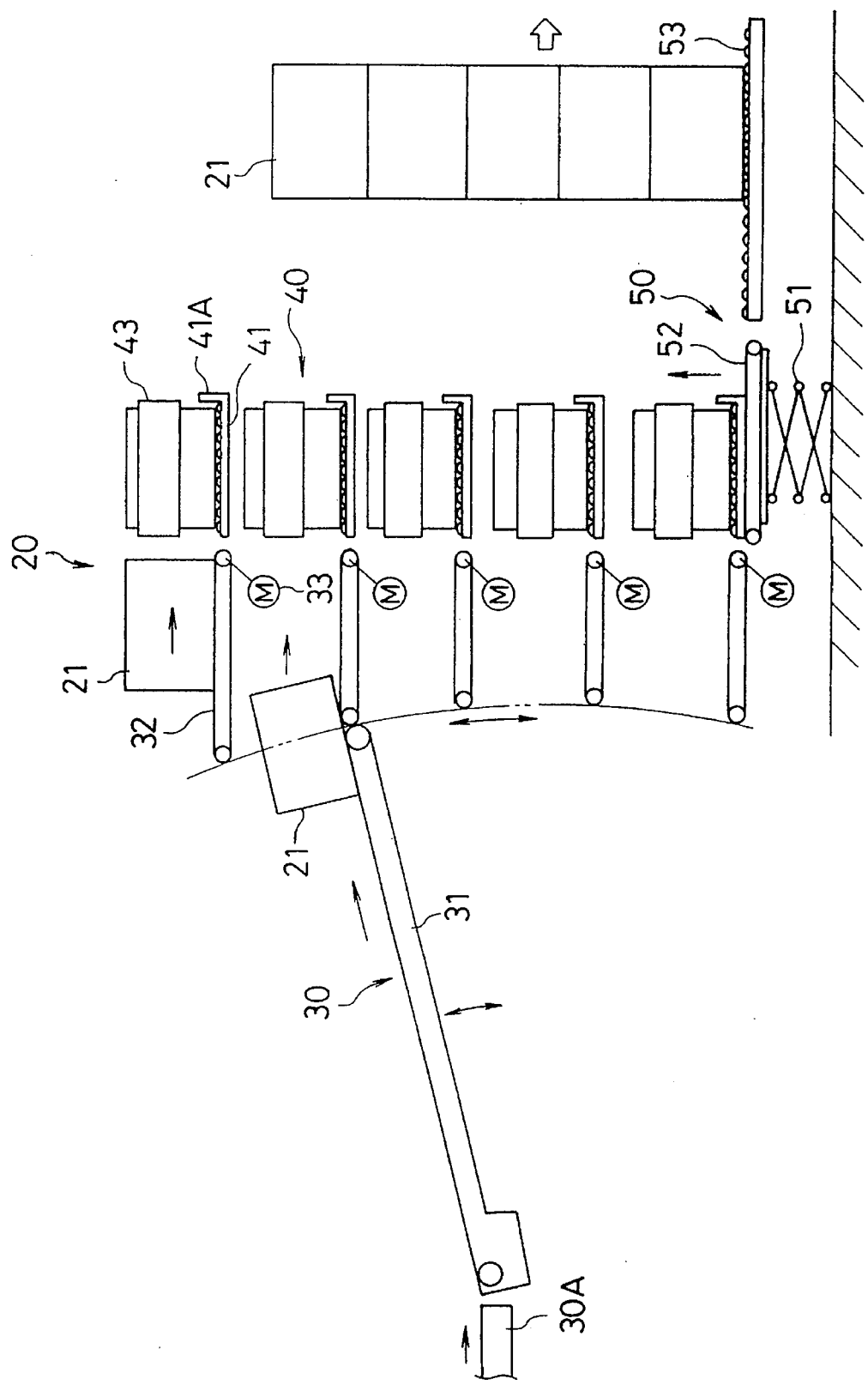
FIG. 2 is a side view showing the apparatus shown in FIG. 1.

FIGS. 1 and 2 show a box-shaped article stacking apparatus 20 as a first embodiment of the invention. In the apparatus 20, a plurality of box-shaped articles 21 such as containers, cardboard boxes, etc. are stacked to be conveyed to a deliverer. The apparatus 20 comprises an article in-feeder 30, an article supporter 40 and an article out-feeder 50.

The article supporter 40 is disposed on the out-feed side of the article in-feeder 30 and above the article out-feeder 50, and it includes a plurality of (five in the illustrated example) pairs of supporting members 41 each provided in each of vertically spaced-apart article receiving zones. Each pair of supporting members 41, i.e., a left and a right supporting member 41, can be switched between an article supporting position and an article releasing position. They are brought to the article supporting and releasing positions by respective drive cylinders 42. When the pair of supporting members 41 are brought to the article supporting position, they support the bottom of a box-shaped article 21.

The article supporter 40 further includes pairs of holding members 43 each disposed in each article receiving zone above the associated paired supporting members 41. The paired holding members 43 can be switched between an article holding position and an article releasing position. The paired holding members 43, i.e., a left and a right holding member 43, are switched between the article holding and releasing positions by respective drive cylinders 44. When the paired holding members 43 are set in the article holding position, they support the box-shaped article 21 supplied to the associated supporting members 41 from the both sides of the article 21. As an alternative to the paired holding members 43, it is possible that only one of them can be driven by a drive cylinder 44 while the other is made stationary.

The article supporter 40 further includes an optical sensor assembly 45 in each article receiving zone and under the supporting members 41. Each optical sensor assembly 45 comprises a pair of, i.e., left and right, transmitting optical sensors to detect a box-shaped article 21 being lifted. It is possible to replace the optical sensor assembly with other sensing means, for instance (a) a reflexive reflecting optical sensor based on reflection by mirror, (b) a reflecting optical sensor activated by an article and (c) a limit switch.

In the article supporter 40, the paired supporting members 41 do not have any box-shaped article in-feeding drive source, but receive a box-shaped article 21, which is fed in from the article in-feeder 30, up to a position in engagement with their end stoppers 41A of the paired supporting members owing to the momentum of the article 21. The article supporting surface of the supporting members 41 is constituted by a slippery material, such as Teflon, or by free rollers or the like. Suitably, the article supporting surface of the supporting members 41 has a gentle downward slope toward the end stoppers 41A to facilitate the in-feeding of the box-shaped article 21.

The article in-feeder 30 includes a swinging conveyor 31 which is capable of swinging vertically in front of the plurality of article receiving zones of the article supporter 40. The swinging conveyor 31 can be positioned such that its article out-feeding level matches the article in-feeding level of the paired supporting members 41 set in an article supporting position in each article receiving zone. Thus, the article in-feeder 30 can supply box-shaped articles 21 to the individual paired supporting members 41 set in the respective article supporting positions. Designated at 30A is an article in-feeding conveyor.

The article in-feeder 30 further includes storage conveyors 32 each disposed on the out-feed end side of the swinging conveyor 31 and at a position at the immediate front of the paired supporting members 41 set at the article supporting position in each article receiving zone. Designated at 33 are driving motors of each of the storage conveyors 32.

The article out-feeder 50 includes a lifter 51 and a chain conveyor 52 provided thereon. In the article out-feeder 50, the chain conveyor 52 is raised and lowered by the lifter 51 such that box-shaped articles 21 on the individual pairs of supporting members 41 can be received as a stack when the pairs of supporting members are set to the article releasing position thereof. An article out-feed conveyor 53 is provided on the out-feed side of the chain conveyor 52 at a lower set position thereof.

Now, the procedure of stacking box-shaped articles 21 in the box-like article stacking apparatus 20 will be described (see FIG. 4).

(1) Operation of feeding articles onto storage conveyors 32

The swinging conveyor 31 is caused to swing vertically and to be positioned successively such that its article out-feed level matches the article in-feed level of the storage conveyor 32 in each of the article receiving zones. Thus, box-shaped articles 21 are distributed successively from the swinging conveyor 31 to the storage conveyors 32.

(a) In the operation in (1) above, if the box-shaped articles 21 are supplied to the swinging conveyor 31 in the earlier delivery order, the swinging conveyor 31 is driven such as to distribute the box-shaped articles 21 from the uppermost storage conveyor 32 first and then to successively lower storage conveyors 32.

(b) In the operation in (1) above, if the box-shaped articles 21 are supplied to the swinging conveyor 31 in the later delivery order, the swinging conveyor 31 is driven such as to distribute the box-shaped articles 21 from the lowermost storage conveyor 32 first and then to successively upper storage conveyors 32.

(c) In the operation in (1) above, if the order of supply of the box-shaped articles 21 has no regard to the delivery order, the delivery order of the individual box-shaped articles 21 is determined by the supply thereof to the swinging conveyor 31, and the swinging conveyor 31 is caused to swing vertically to distribute the box-shaped articles 21 to the storage conveyors 32 such that articles which are distributed to be delivered earlier are above those to be delivered later.

(2) Operation of stacking articles by articles supporter 40

Box-shaped articles 21 which have been supplied to the individual pairs of supporting members 41 are positioned with paired holding members 43.

Then lifter 51 is raised. When the optical sensor 45 of each article receiving zone detects that the lower box-shaped article 21 has risen, the supporting members 41 and holding members 43 of this article receiving zone are switched to the article releasing position. In this way, the supporting members 41 and holding members 43 are released successively from the lowermost stage, whereby the box-shaped articles 21 are stacked one on another on the chain conveyor 52.

When the box-shaped articles 21 in all the article receiving zones have been stacked, the lifter 51 is lowered, and the stacked articles are transferred from the chain conveyor 12 onto the out-feed conveyor 53.

After the operation in ③ above, the supporting members 41 in the individual article receiving zones are switched to the article supporting position to be ready for receiving following box-shaped articles 21.

(3) Operation of transferring articles from storage conveyors 32 to supporting members 41

When the box-shaped articles 21 have been distributed to all the storage conveyors 32 in the operation in (1) above, the box-shaped articles 21 are transferred one at a time to the supporting members 41 in the individual article receiving zones which have been held ready to receive them in the operation in (2) above. The box-shaped articles 21 transferred to the supporting members 41 are stacked in the operation in (2) above.

The box-shaped articles 21 having been supplied to and supported by the supporting members 41, are stacked on lower box-shaped articles 21 with the switching of the supporting members 41 to the article releasing position. Thus, during the operation of stacking, the box-shaped articles 21 need not be supported in space by utilizing any engagement recess formed on their sides. In other words, it is possible to stack box-shaped articles 21 without any engagement recess. Further, box-shaped articles 21 such as containers which do not have any engagement recess on any side, can be dealt with without any restriction on the direction or position because the recesses are not provided.

The conveyor 31 for supplying box-shaped articles 21 is caused to swing and be positioned to correspond to the article in-feeding position of each pair of supporting members 41 as in (a) to (c) described above. In this way each article is supplied from the conveyor 31 to each pair of supporting members 41. Thus, the swinging position of the conveyor 31 can be controlled such that articles to be delivered earlier are stacked above those to be delivered later.

With the provision of the storage conveyors 32 in the immediate front of the individual pairs of supporting members 41, the operation of distributing box-shaped articles 21 to all of the storage conveyors 32 and the operation of stacking the articles 21 that have been supplied to the supporting members 41, can be carried out concurrently. Thus, the overall stacking operation time of one stacking cycle with a plurality of stages can be reduced to increase productivity.

Figure 7:
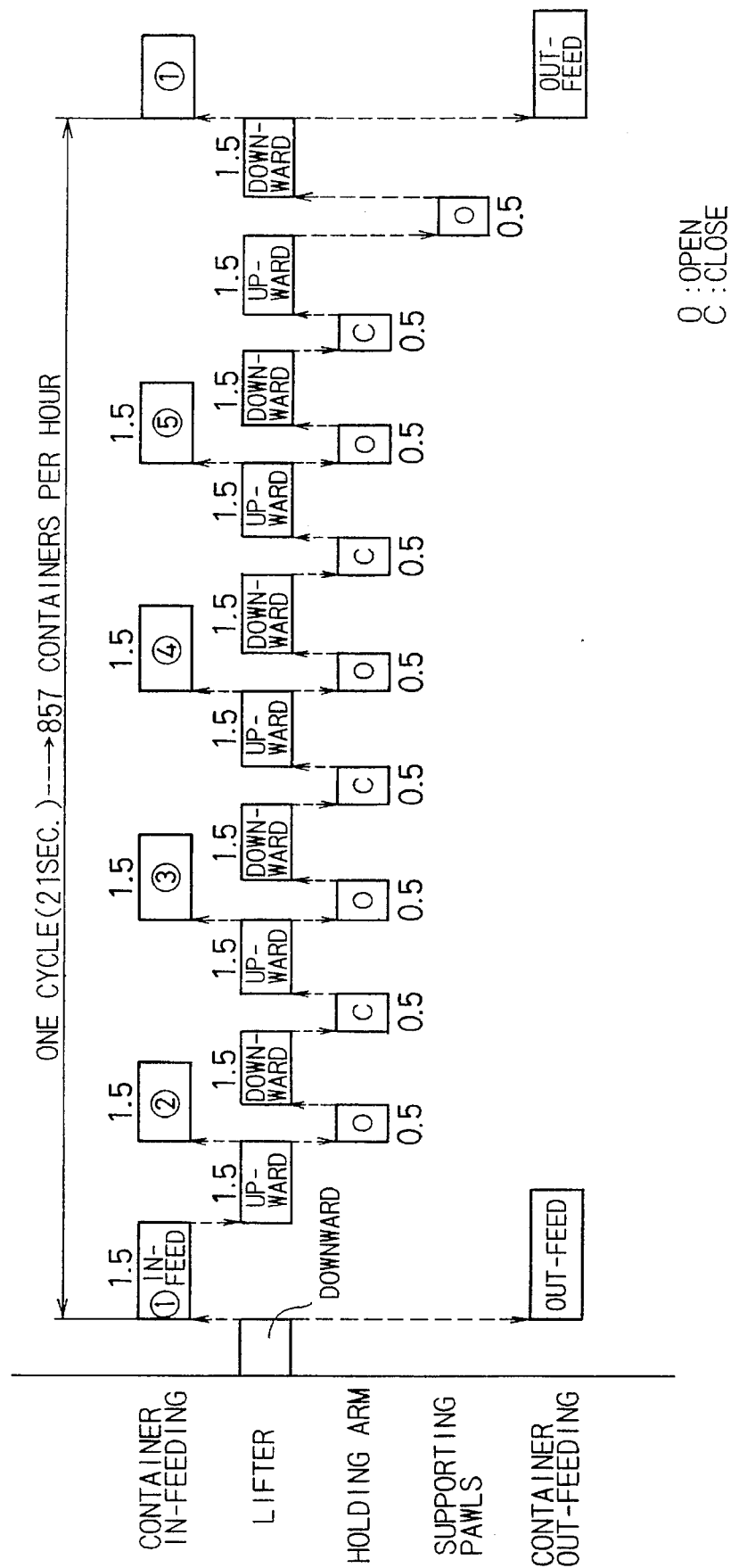
FIG. 7 is a view illustrating the stacking operation in the prior art apparatus.

For example, the overall stacking operation time of one cycle with five stages was 16.5 seconds (1,090 articles per hour) as shown in FIG. 4, and it was confirmed that it is possible to improve the productivity by 20% compared to the prior art example case as shown in FIG. 7.

FIGS. 3A and 3B show a second embodiment of the invention, which is different from the previous first embodiment in that a circulatory conveyor 61 is used instead of the swinging conveyor 31. An article in-feeding conveyor 30A is coupled to a part of the circulatory path of the circulatory conveyor 61. Box-shaped articles 21 supplied by the article in-feeding conveyor 30A are each received in each belt conveyor 62. The circulatory conveyor 61 moves in relation to each belt conveyor 62, and it positions and stops a group of belt conveyors 62 each receiving a group of (for instance five) box-shaped articles 21 to be stacked at positions corresponding to all article receiving zones of an article supporter 40. The box-shaped articles 21 on the belt conveyors 62 in the group are transferred one at a time to supporting members 41 in the individual article receiving zones.

At this time, the circulatory conveyor 61 determines the direction of travel of the belt conveyors 62 such that box-shaped articles 21 to be delivered earlier are transferred to upper supporting members 41 in the article supporter 40.

When the box-shaped articles 21 are supplied in the earlier delivery order from the article in-feeding conveyor 30A to the circulatory conveyor 61, circulation of the belt conveyors 62 progresses in the direction of the arrow in FIG. 3A so that belt conveyors 62 on their leading side during the course of travel, are positioned to correspond to upper supporting members 41.

When box-shaped articles 21 are supplied in the later delivery order from the conveyor 30A to the circulatory conveyor 61, the belt conveyors 62 are moved in the direction opposite to the arrow direction so that belt conveyors 62 on their leading side during the course of travel, are positioned to correspond to lower supporting members 41.

During the operation of the circulatory conveyor 61 to position the belt conveyors 62 at the positions corresponding to all the article receiving zones in the article supporter 40, the article supporter 40 can concurrently perform entirely the same article stacking operation as in the first embodiment.

In other words, the circulatory conveyor 61, which has the belt conveyors 62 movable vertically past the front of a plurality of article receiving zones, has two functions, i.e., (1) a function of positioning each belt conveyor 62 such that the article out-feed level thereof corresponds to the article in-feed level the supporting members 41 at the article supporting position in each article receiving zone, and (2) a function of storing articles at a position immediately in front of the supporting members 41 set at that article supporting position in each article receiving zone. Further, besides replacing the swinging conveyor 31 in the first embodiment, the circulatory conveyor 61 has the further function of the storage conveyors 32.

While some preferred embodiments of the invention have been described with reference to the drawings, these embodiments are by no means limitative, and changes and modifications may be made in the details of the structural design without departing from the scope of the subject matter of the invention.

As has been described in the foregoing, according to the invention, it is also possible to stack box-shaped articles that have no engagement recesses on any side.

Further, according to the invention, it is possible to stack box-like articles in the earlier delivery order to the upper position irrespective of whether the articles are supplied in the earlier or later delivery order.

Moreover, according to the invention, it is possible to reduce the overall stacking operation time of one stacking cycle with a plurality of stages and thus increase productivity.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A method of vertically stacking a plurality of box-shaped articles which are individually arranged within respective vertically arrayed article receiving zones of an article supporter, each of said zones having an upper portion and a lower portion, comprising the steps of:

providing a supporting member at said lower portion of each of the article receiving zones, each of said supporting members vertically spaced-apart and capable of moving between an article supporting position and an article releasing position;

supplying a box-shaped article to each respective supporting member when said member is in the article supporting position;

upwardly lifting an article out-feeder to one of said article receiving zones and subsequently setting the supporting member at said one zone to the article releasing position, such that a first article is received on an article receiving portion of said out-feeder, then upwardly lifting said out-feeder to another article receiving zone and setting the supporting member at said other zone to the article releasing position so that a second article is transferred from the other supporting member onto the first article on said out-feeder such that a stack of articles is formed on said out-feeder.

2. The method of stacking according to claim 1, wherein said box-shaped articles are supplied to said supporting members by a conveyor, the conveyor vertically moveable, wherein the conveyor has an article out-feed level corresponding to an article in-feed level of each article receiving zone for supplying a box-shaped article from the conveyor to each supporting member.

3. The method of stacking according to claim 2, further including the step of providing a respective storage conveyor between said conveyor and each of said article receiving zones of said article supporter, each of said storage conveyors provided at a vertical position immediately facing the supporting members, then supplying and temporarily holding a later-supplied article on said storage conveyor until a previously supplied article within said receiving zone is stacked, whereby said later-supplied article is then transferred to said supporting member from said storage conveyor.

4. An apparatus for stacking and feeding a plurality of box-shaped articles comprising: an article in-feeder having an out-feed side; an article supporter; and an article out-feeder, the article supporter being disposed on the out-feed side of the article in-feeder and above the article out-feeder, said supporter comprised of a plurality of vertically spaced article receiving zones, each of said zones having an upper and lower portion, wherein a supporting member is disposed in a lower portion of each article receiving zone, each of the supporting members movable between an article supporting position and an article releasing position, the article in-feeder supplying box-shaped articles to each of the supporting members when the supporting members are in the article supporting position, the article out-feeder comprised of an article receiving portion and a lifter, said lifter vertically lifting said article receiving portion in order to move said article out-feeder to each of said article receiving zones, such that the article outfeeder is lifted to a first receiving zone and receives a first box-shaped article from a respective supporting member, when the supporting member of said first article receiving zone is in the article releasing position, and wherein said articles arranged within the other article receiving zones are received by said out-feeder in the exact manner as said first article, such that a later-received article is stacked upon the first article so that all articles resultantly are in a stacked form.

5. The apparatus for stacking box-shaped articles according to claim 4, wherein the article in-feeder includes a vertically movable conveyor positionable to be coextensive with each respective article receiving zone, wherein the conveyor has an article out-feed level corresponding to an article in-feed level of each article receiving zone.

6. The apparatus for stacking box-shaped articles according to claim 5, wherein the article in-feeder further includes at least one storage conveyor, said at least one storage conveyor disposed at a vertical position immediately facing the supporting members.

* * * * *